United States Patent
Sagae et al.

(10) Patent No.: US 8,606,323 B2
(45) Date of Patent: Dec. 10, 2013

(54) BASE STATION, TERMINAL EQUIPMENT, AND METHOD FOR MOBILE COMMUNICATION SYSTEM IN AN ENVIRONMENT WHERE AREAS EACH INCLUDING MULTIPLE RADIO COMMUNICATION SYSTEMS COEXIST

(75) Inventors: Yuta Sagae, Kawasaki (JP); Hitoshi Yoshino, Yokosuka (JP)

(73) Assignee: NTT DoCoMo, Inc., Tokyo (JP)

(*) Notice: Subject to any disclaimer, the term of this patent is extended or adjusted under 35 U.S.C. 154(b) by 367 days.

(21) Appl. No.: 12/993,347

(22) PCT Filed: May 15, 2009

(86) PCT No.: PCT/JP2009/059088
§ 371 (c)(1),
(2), (4) Date: Feb. 14, 2011

(87) PCT Pub. No.: WO2009/142163
PCT Pub. Date: Nov. 26, 2009

(65) Prior Publication Data
US 2011/0130164 A1    Jun. 2, 2011

(30) Foreign Application Priority Data

May 19, 2008   (JP) ................................. 2008-131376

(51) Int. Cl.
*H04W 88/08*  (2009.01)
*H04W 4/06*  (2009.01)
*H04H 60/91*  (2008.01)

(52) U.S. Cl.
USPC ..... 455/561; 455/3.01; 455/432.1; 455/414.3

(58) Field of Classification Search
None
See application file for complete search history.

(56) References Cited

U.S. PATENT DOCUMENTS

| 6,223,036 B1 * | 4/2001 | Kuwabara ..................... 455/434 |
| 6,510,146 B1 | 1/2003 | Korpela et al. |
| 2003/0179731 A1 | 9/2003 | Noguchi et al. |

FOREIGN PATENT DOCUMENTS

| EP | 0 888 026 A2 | 12/1998 |
| EP | 0 888 026 A3 | 12/1998 |
| JP | 11 075237 | 3/1999 |
| JP | 2005 094806 | 4/2005 |

OTHER PUBLICATIONS

Martigne, P., et al., "An alternative concept to scanning process for cognitive radio systems: technical and regulatory issues," 16th IST Mobile and Wireless Communications Summit, pp. 1-5, (Jul. 2007).

(Continued)

*Primary Examiner* — Philip Sobutka
(74) *Attorney, Agent, or Firm* — Oblon, Spivak, McClelland, Maier & Neustadt, L.L.P.

(57) ABSTRACT

A base station includes an internal-area information storing unit storing system information necessary to connect to radio systems in an area to which the base station belongs; an external-area transmission method information storing unit storing external-area transmission method information indicating a method of transmitting a common control signal in an area adjacent to the area to which the base station belongs; and a transmitting unit wirelessly transmitting the common control signal including the system information stored in the internal-area information storing unit or the external-area transmission method information to the terminal equipment. The common control signal including the external-area transmission method information is transmitted at regular or irregular transmission timings.

10 Claims, 8 Drawing Sheets

(56) References Cited

OTHER PUBLICATIONS

Perez-Romero, J., et al., "A Novel On-Demand Cognitive Pilot Channel enabling Dynamic Spectrum Allocation," IEEE DYSPAN, pp. 46-54, (Apr. 17-20, 2007).
International Search Report issued Aug. 18, 2009 in PCT/JP09/059088 filed May 15, 2009.
Extended Search Report issued May 4, 2012 in European patent application No. 09750525.9.
Anonymous: "The $E^2R$ II Flexible Spectrum Management (FSM) Framework and Cognitive Pilot Channel (CPC) Concept—Technical and Business Analysis and Recommendations", End-to-End Reconfigurability II ($E^2R$ II) White Paper, XP008145264, Nov. 1, 2007, pp. 1-52.

* cited by examiner

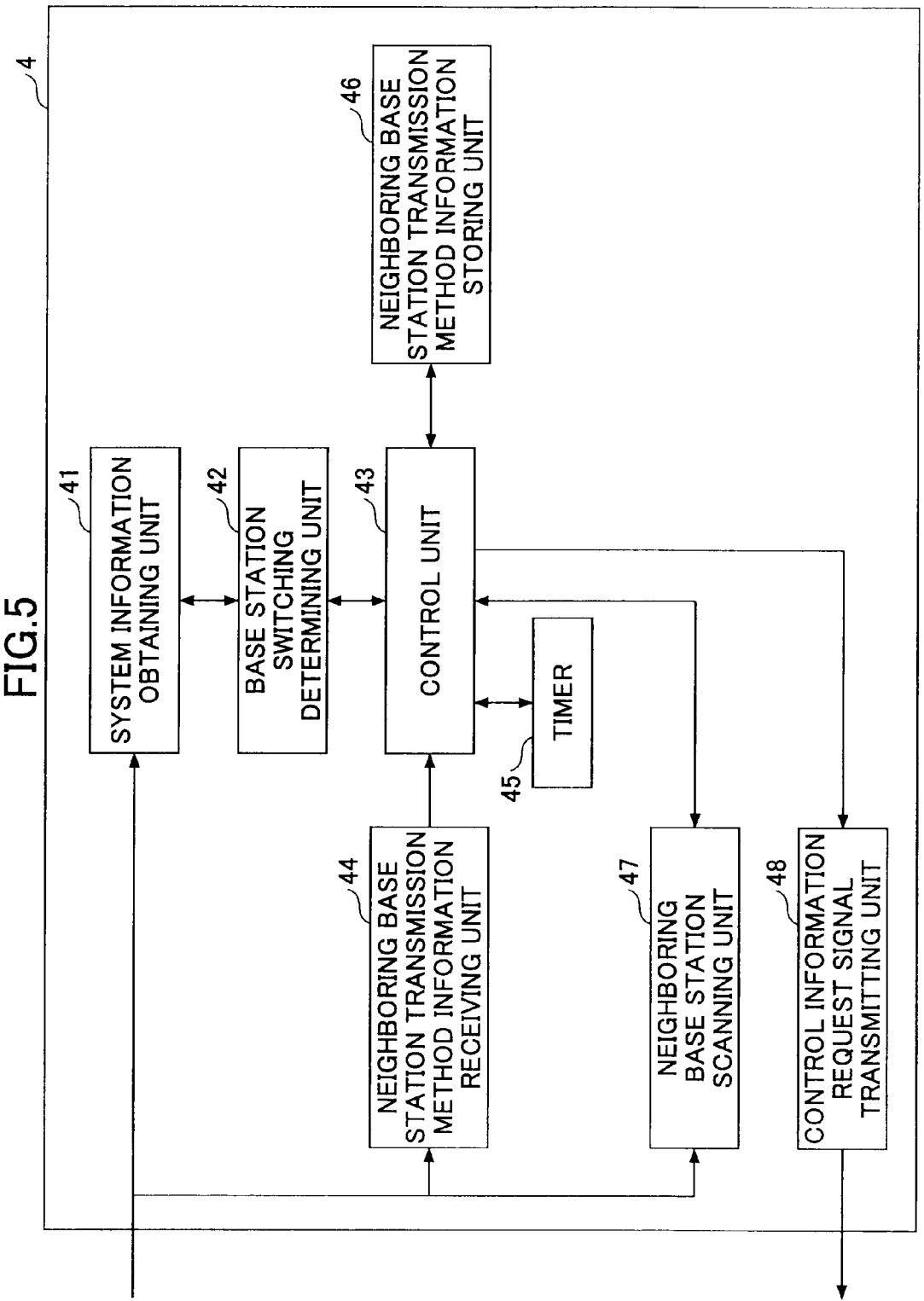

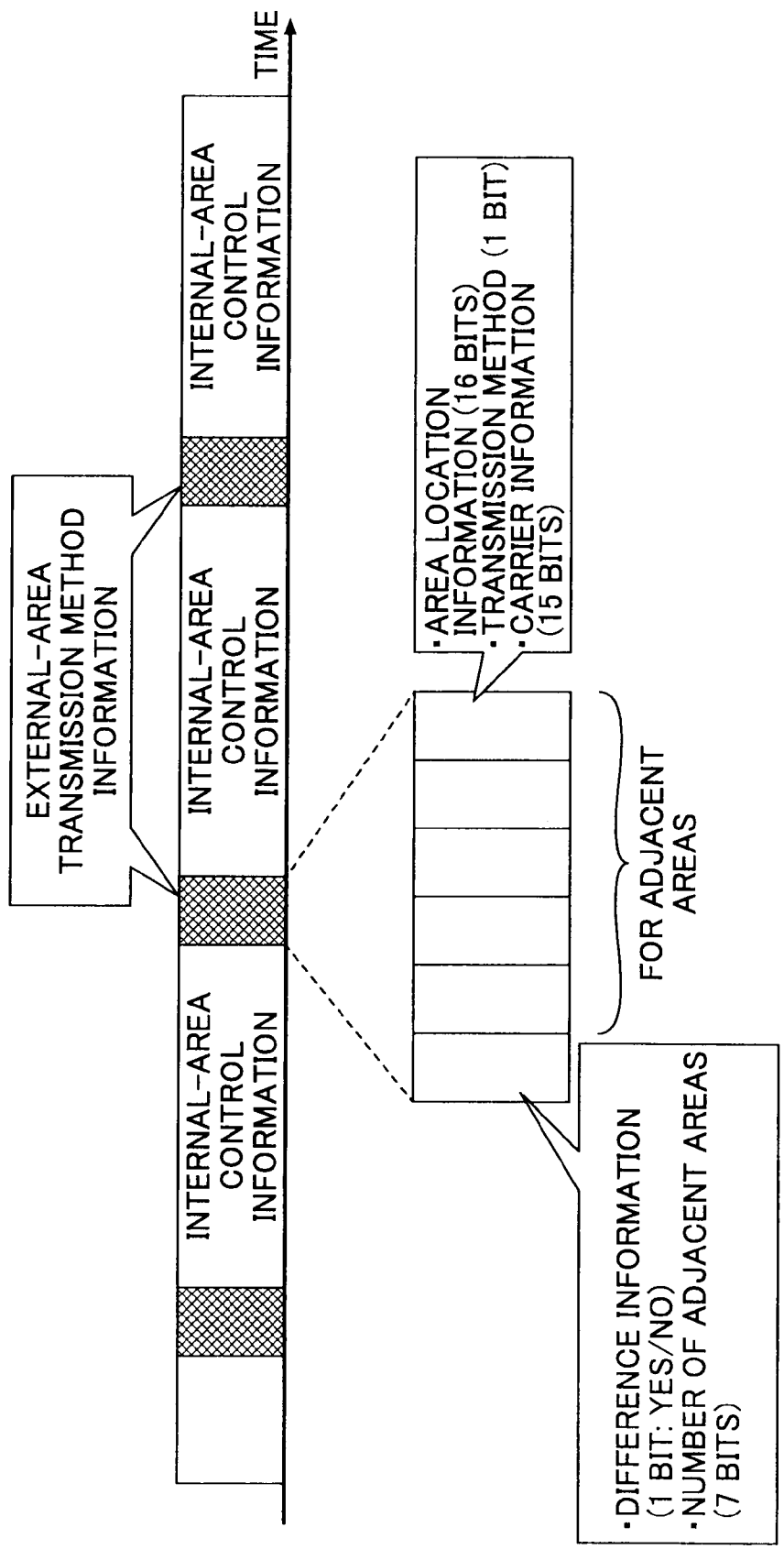

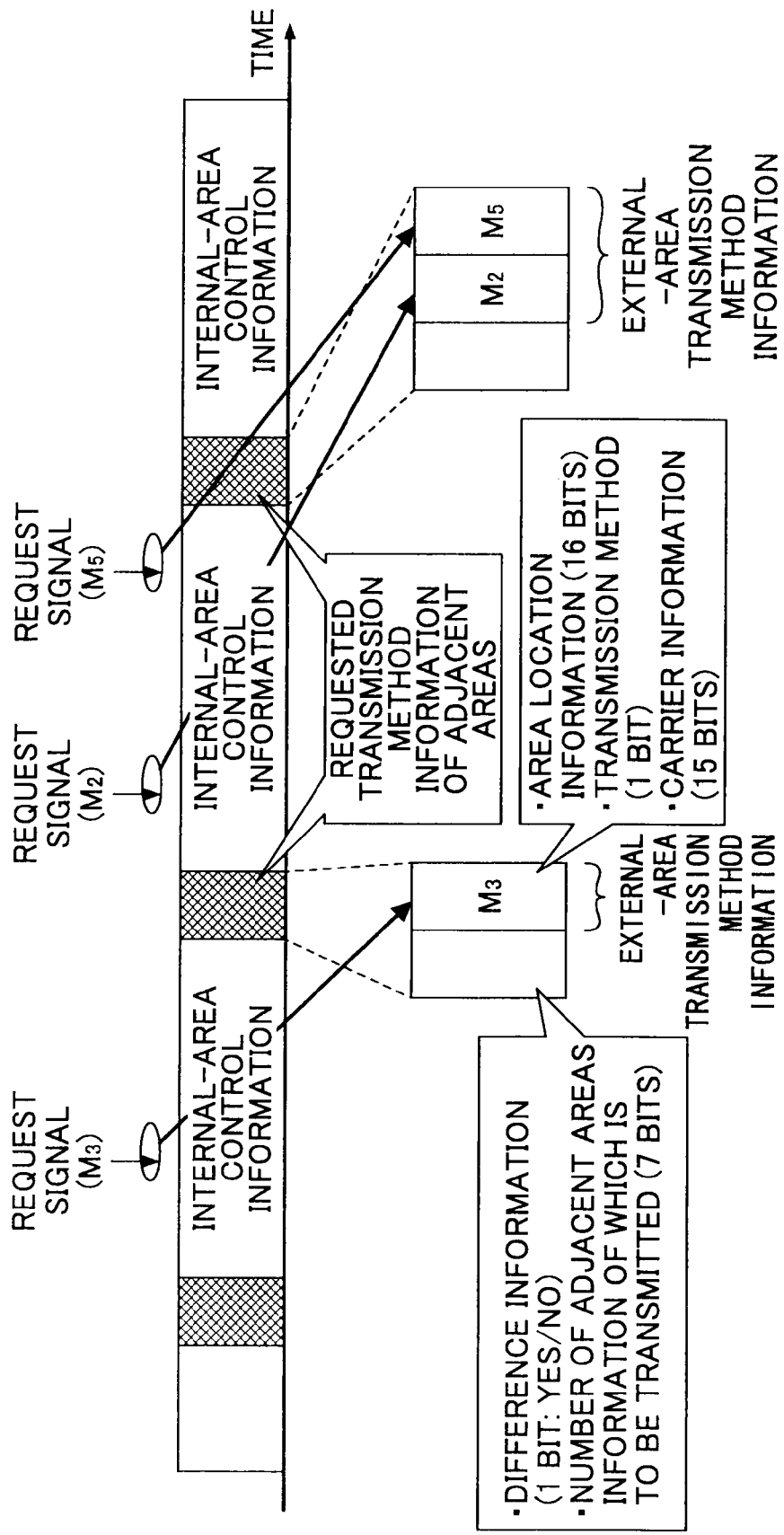

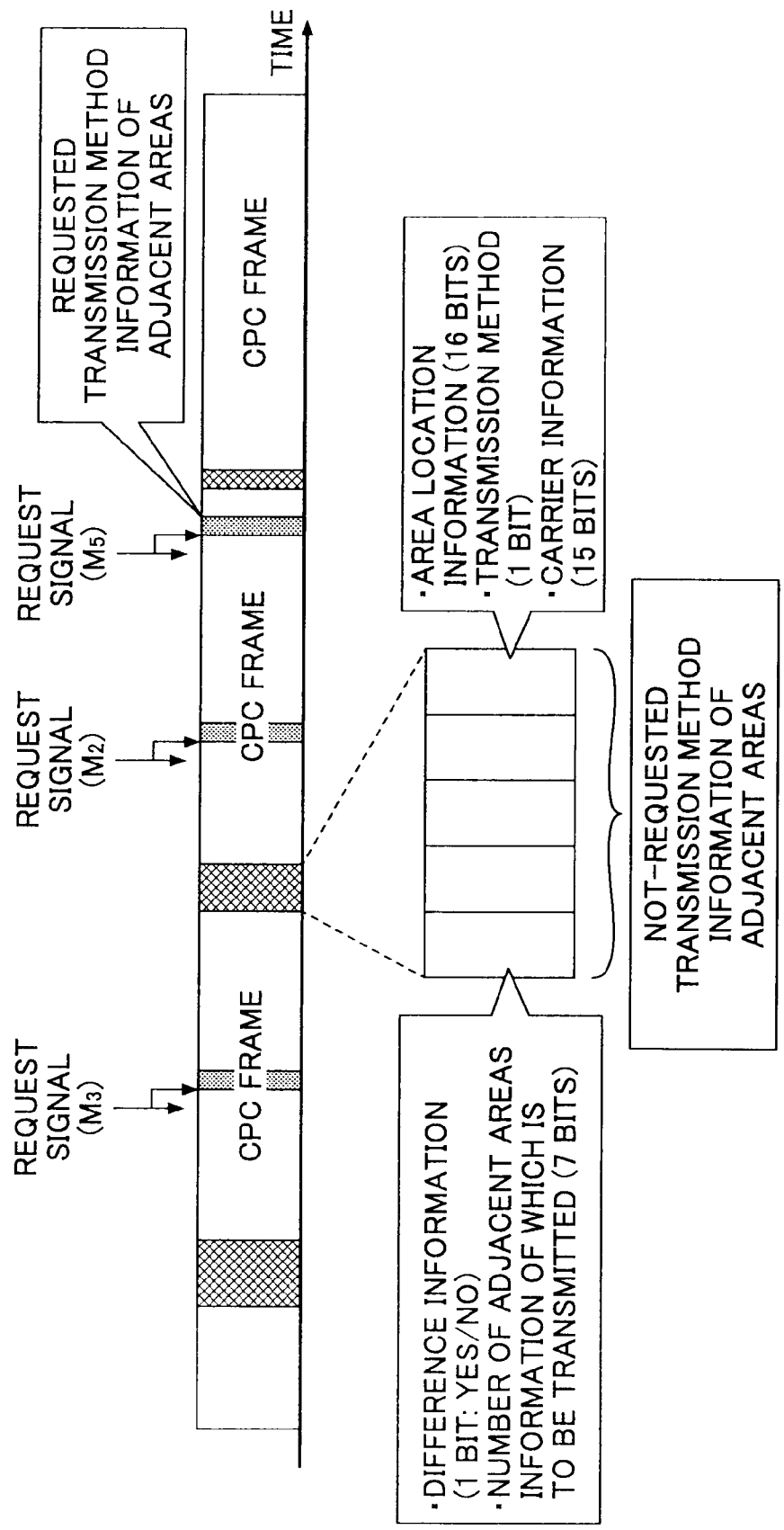

US 8,606,323 B2

BASE STATION, TERMINAL EQUIPMENT, AND METHOD FOR MOBILE COMMUNICATION SYSTEM IN AN ENVIRONMENT WHERE AREAS EACH INCLUDING MULTIPLE RADIO COMMUNICATION SYSTEMS COEXIST

TECHNICAL FIELD

The present invention generally relates to mobile communication technologies. More particularly, the present invention relates to a base station, terminal equipment, and a method used in an environment where areas each including multiple radio communication systems coexist.

BACKGROUND ART

Until recently, it has been customary to assign fixed frequencies exclusively to systems and telecommunications providers of each country or region according to their respective needs. However, frequency resources have decreased drastically due to the introduction of high-speed, wide-band radio communication systems and new radio services that have been made possible by wide system frequency bands, advanced radio interfaces, and rapid standardization. Therefore, it is becoming difficult to newly assign fixed frequencies exclusively to newly-introduced radio communication systems.

A technology disclosed in "An alternative concept to scanning process for cognitive radio systems: technical and regulatory issues" (Martigne, P.; Moessner, K.; Cordier, P.; Ben Jemaa, S.; Houze, P.; Agusti, R.; Deschamps, B.; Bender, P.; Jeanty, L.; Bourse, D.; 16th IST Mobile and Wireless Communications Summit, 2007; 1-5 July 2007; pp. 1-5) tries to improve the efficient use of frequency resources by using a cognitive pilot channel (CPC).

FIG. 1 is a drawing illustrating an outline of a system using the CPC. In this system, the entire geographical region covered by the system is divided into areas called meshes and each area (mesh) includes multiple radio systems of the same type or different types. Exemplary radio systems include IMT-2000 systems, Long Term Evolution (LTE) systems, and broadcasting systems for television broadcasting and radio broadcasting. In FIG. 1, it is assumed that two radio systems of telecommunications operators 1 and 2 are providing services in the same area. The CPC includes information on frequencies and radio schemes that is necessary to use radio systems being operated in each area. Therefore, with the CPC, a terminal does not have to scan all available radio systems to connect to a desired radio system. In other words, the terminal can find out and connect to a desired radio system based on information in the CPC. The CPC can also be used to partially change radio system parameters and thereby to construct a flexible radio system as described in "A Novel On-Demand Cognitive Pilot Channel enabling Dynamic Spectrum Allocation, " J. Perez-Romero, et al., IEEE Dyspan 2007. Thus, using the CPC makes it possible to reduce the prices of terminals, to flexibly change radio system parameters, and to improve the frequency efficiency.

DISCLOSURE OF INVENTION

Problems to be Solved by the Invention

There are roughly two possible methods for transmitting the CPC. The first is a broadcast transmission method where information on a mesh belonging to the base station is regularly transmitted via the CPC. The second is an on-demand transmission method where information on a mesh requested by terminal equipment is transmitted via the CPC from the base station. The broadcast transmission method and the on-demand transmission method are suitable for different environments. For example, assuming that the CPC is transmitted wirelessly, the size of an area covered by a base station transmitting the CPC, the number of meshes, the number of users, the user density, and the moving speed of users vary depending on the environment where the base station is installed. In an environment where the number of meshes is small and the user density is high, the broadcast transmission method may be more efficient. Meanwhile, in an environment where the user density is low and the moving speed of users is high, the on-demand transmission method may be more efficient. Also, there is terminal equipment such as a notebook PC that includes both a wired communication interface (e.g., for an optical fiber) and a wireless communication interface (e.g., for a wireless LAN). Such terminal equipment can obtain information on radio systems available in an area it belongs to via a wired network in advance. Further, different radio systems may be based on different standards and frequencies may be used in different manners in different areas. In other words, different frequencies and communication methods may be used in different areas to transmit the CPC. Under the above circumstances, when terminal equipment moves from one area to another area, the transmission methods may be switched between the broadcast transmission method and the on-demand transmission method and the terminal equipment may become unable to easily receive the CPC. This is particularly the case when the terminal equipment moves from an indoor environment to an outdoor environment. Also, when the terminal equipment switches between the wired communication interface and the wireless communication interface, the terminal equipment may not be able to easily receive the CPC due to different CPC transmission methods. Thus, when the terminal equipment moves between adjacent areas using different CPC transmission methods or the terminal equipment switches between network interfaces, the terminal equipment becomes unable to easily obtain system information necessary to connect to a desired radio system from the CPC. If the CPC transmission method is unknown, the terminal equipment needs to scan a wide frequency range to receive the CPC. This is particularly disadvantageous for a mobile terminal for which reduction of power consumption is especially important.

Assuming that each area includes multiple radio systems and a common control channel including system information necessary to connect to the radio systems in the area is transmitted to user equipment, an aspect of the present invention enables the terminal equipment to easily receive the system information even when different common control channel transmission methods are used in adjacent areas or for different network interfaces.

Means for Solving the Problems

An aspect of the present invention provides a base station for a system encompassing multiple areas each including one or more radio systems. The base station transmits information including frequencies being used by the radio systems in one of the areas. In each area, system information necessary to connect to one or more radio systems is transmitted via a common control signal to terminal equipment. The base station includes an internal-area information storing unit storing the system information necessary to connect to the radio systems in an area to which the base station belongs; an external-area transmission method information storing unit storing external-area transmission method information indicating a method of transmitting the common control signal in an area adjacent to the area to which the base station belongs; and a transmitting unit transmitting the common control signal including the system information stored in the internal-area information storing unit or the external-area transmission method information to the terminal equipment. The common control signal including the external-area transmission method information is transmitted at regular or irregular transmission timings.

Advantageous Effect of the Invention

Assuming that each area includes multiple radio systems and a common control channel including system information necessary to connect to the radio systems in the area is transmitted to user equipment, an aspect of the present invention enables the terminal equipment to easily receive the system information even when different common control channel transmission methods are used in adjacent areas or for different network interfaces.

BRIEF DESCRIPTION OF THE DRAWINGS

FIG. 5 is a block diagram of terminal equipment according to an embodiment of the present invention;
FIG. 6 is a drawing illustrating an exemplary structure of a transmission frame for transmitting internal-area system information and external-area transmission method information;
FIG. 7 is a drawing illustrating an exemplary structure of a transmission frame for transmitting internal-area system information and external-area transmission method information;
and
FIG. 8 is a drawing illustrating an exemplary structure of a transmission frame for transmitting internal-area system information and external-area transmission method information.

BEST MODE FOR CARRYING OUT THE INVENTION

Figure 1:
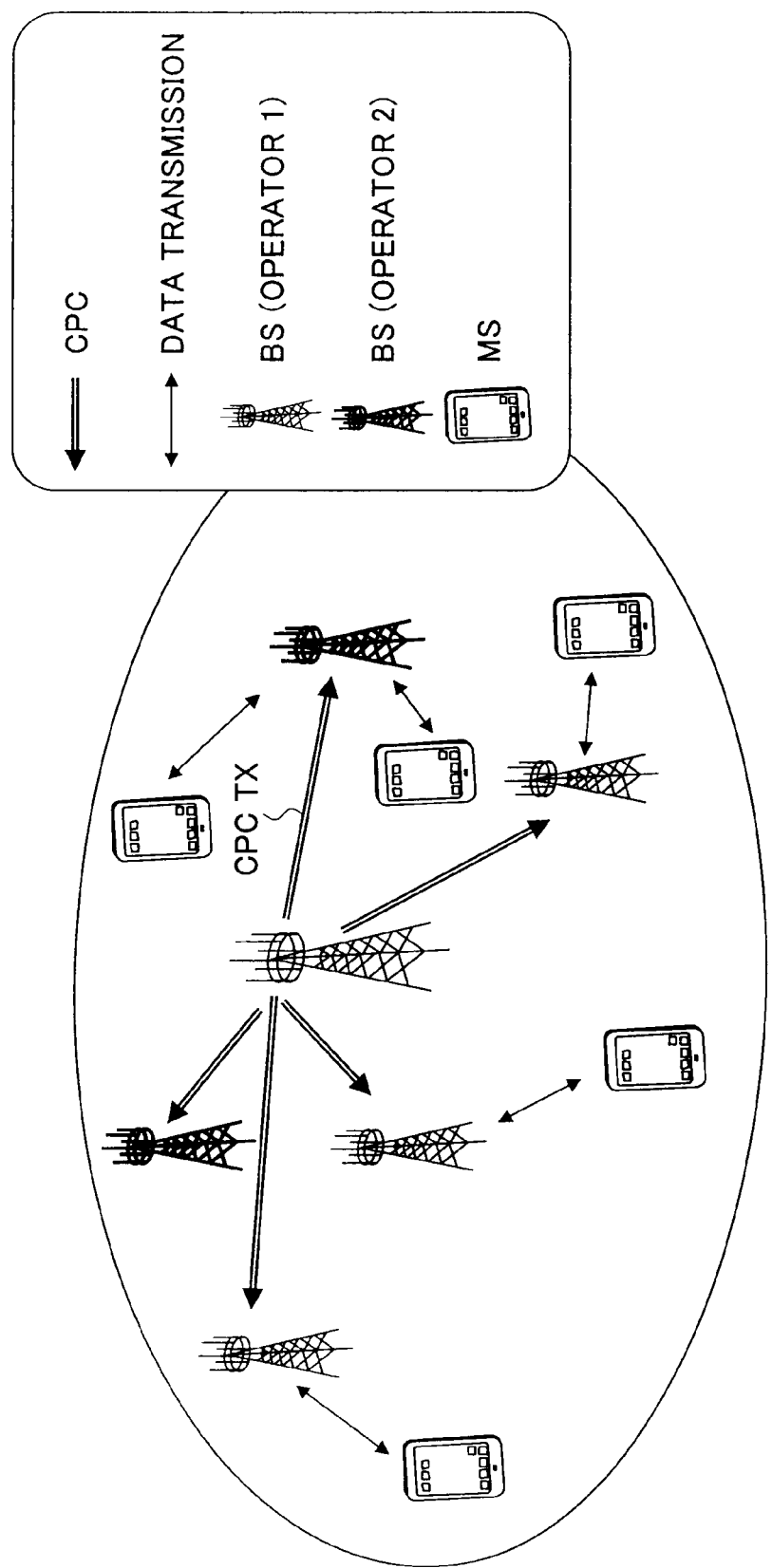
FIG. 1 is a drawing illustrating an outline of a system.

A base station according to an embodiment of the present invention is used in a system encompassing multiple areas each including one or more radio systems. In each area, system information necessary to connect to the radio systems is transmitted via a control signal to terminal equipment. The base station stores internal-area system information necessary to connect to radio systems in an area $M_1$ to which the base station belongs. The area $M_1$ corresponds to one mesh. The internal-area system information, for example, includes information on frequency bands and radio access technologies (RAT) used by the radio systems. The base station also stores external-area transmission method information indicating a method of transmitting a common control signal in an area $M_2$ that is different from the area $M_1$. The area $M_1$ and the area $M_2$ are adjacent to each other. One or more adjacent areas may exist for each area. Also, a control signal may be transmitted via a wired network in the area $M_1$ and a control signal may be transmitted via a wireless network in the area $M_2$, i.e., different network interfaces may be used in the areas $M_1$ and $M_2$.

The base station transmits, to the terminal equipment, not only the system information of the area to which it belongs, but also external-area transmission method information (may also be called neighboring base station transmission method information) indicating a transmission method of a common control signal in an adjacent area. This configuration enables the terminal equipment to also determine the transmission method of a common control signal in an adjacent area. In other words, this configuration enables the terminal equipment to easily obtain desired system information even when it moves from an area to another area.

According to an embodiment of the present invention, the base station may be configured to transmit a common control signal using both the broadcast transmission method and the on-demand transmission method. This configuration makes it possible to efficiently transmit the CPC to a large number of users and also to transmit necessary information to specific users on demand and thereby allows the terminal equipment to smoothly obtain the CPC.

According to an embodiment of the present invention, terminal equipment is able to receive a common control signal regardless of whether it is transmitted by the broadcast transmission method or the on-demand transmission method and to extract necessary system information from the common control signal. The terminal equipment may also include a function to request the base station to transmit the external-area transmission method information. This configuration enables terminal equipment in an area to determine a transmission method used in an adjacent area before or after moving to the adjacent area and eliminates the need for the terminal equipment to perform scanning in the adjacent area. This configuration also makes it possible to save energy that would have been used for scanning and is particularly preferable for terminal equipment moving at high speed.

Although the present invention is described below using multiple embodiments, the distinctions between the embodiments are not essential for the present invention and the embodiments may be used individually or in combination. Although specific values are used in the descriptions below to facilitate the understanding of the present invention, the values are just examples and any other appropriate values may also be used unless otherwise mentioned.

<First Embodiment>

A base station of this embodiment uses one or both of the broadcast transmission method and the on-demand transmission method to transmit a common control signal. In FIGs used in the descriptions below, only components that are particularly relevant to the present invention are shown and other components are omitted for brevity. The common control signal of this embodiment is similar to the cognitive pilot channel (CPC) of the related art in that it is commonly used in an area (mesh) including multiple radio systems and is used to report internal-area system information that is necessary to connect to the radio systems in the area to which the base station belongs. However, the common control signal of this embodiment is different from the CPC in that it includes not only the internal-area system information but also external-area transmission method information indicating the transmission method of a signal (a common control signal in an adjacent area) including system information necessary to connect to radio systems in the adjacent area. The internal-area system information includes basic parameters necessary to connect to one or more radio systems in an area. Examples of basic parameters include:

Identification information of an area or a mesh

Information on telecommunications operators providing services in the area

Information on radio access technologies

Information on frequency bands being used

Figure 2:
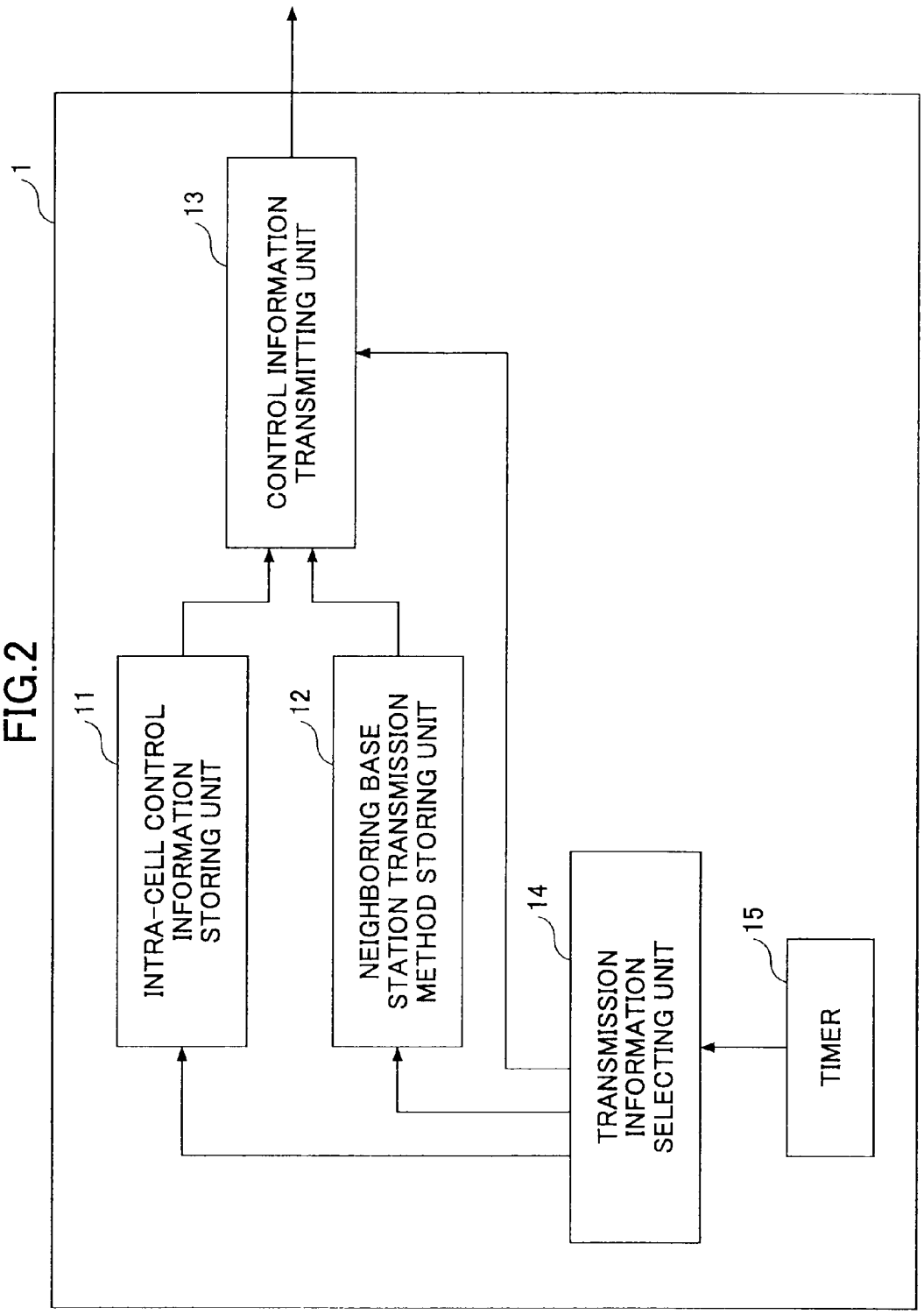
FIG. 2 is a block diagram of a base station transmitting a common control signal using a broadcast transmission method according to an embodiment of the present invention.

FIG. 2 is a functional block diagram of a base station transmitting a common control channel by the broadcast transmission method. As shown in FIG. 2, the base station includes an intra-cell control information storing unit 11, a neighboring base station transmission method storing unit 12, a control information transmitting unit 13, a transmission information selecting unit 14, and a timer 15.

The intra-cell control information storing unit 11 stores internal-area system information necessary to connect to radio systems in an area $M_1$ to which the base station belongs.

The neighboring base station transmission method storing unit 12 stores external-area transmission method information indicating a method of transmitting a common control signal in an adjacent area $M_2$. The common control signal includes system information necessary to connect to radio systems in the area $M_2$. The external-area transmission method information is necessary to properly receive the common control signal transmitted in the area $M_2$. For example, the external-area transmission method information includes the frequency used to transmit the common control signal and information indicating whether the broadcast transmission method or the on-demand transmission method is used to transmit the common control signal.

The control information transmitting unit 13 generates a transmission signal including information input to the control information transmitting unit 13 and transmits the generated signal.

The transmission information selecting unit 14 selects either the intra-cell control information storing unit 11 or the neighboring base station transmission method storing unit 12 according to a trigger from the timer 15 and requests the selected storing unit 11 or 12 to output the stored information to the control information transmitting unit 13.

The timer 15 determines transmission timings of broadcast information including the transmission timing of the internal-area system information and the transmission timing of the external-area transmission method information.

The transmission information selecting unit 14 selects either the intra-cell control information storing unit 11 or the neighboring base station transmission method storing unit 12 at predetermined intervals. The selected storing unit 11 or 12 outputs information to the control information transmitting unit 13. The control information transmitting unit 13 generates a signal including the information output from the storing unit 11 or 12 and transmits the generated signal.

Thus, the internal-area system information (intra-cell control information) and the external-area transmission method information are transmitted as broadcast information to the terminal equipment at regular intervals (timings). This configuration is preferable to improve the frequency efficiency in an environment where a large number of terminals belong to the area. By the way, if the on-demand transmission method where the terminal equipment needs to transmit a request signal is used when the CPC cell coverage is large, the terminal equipment may not be able to properly transmit the request signal because of insufficient transmission power. Therefore, the broadcast transmission method is also preferable in an environment where the CPC cell coverage is large.

Figure 3:
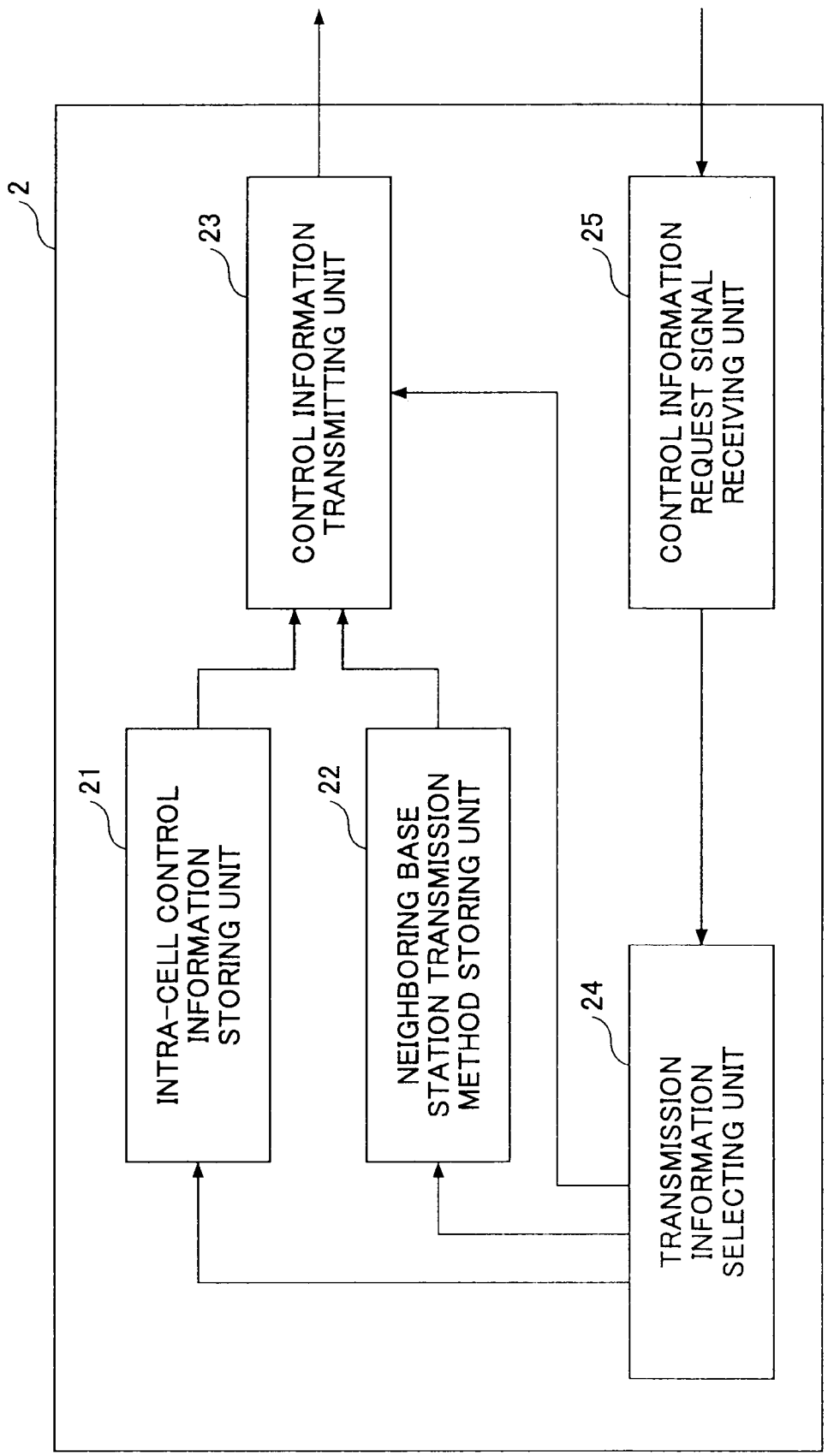
FIG. 3 is a block diagram of a base station transmitting a common control signal using an on-demand transmission method according to an embodiment of the present invention.

FIG. 3 is a functional block diagram of a base station transmitting a common control channel by the on-demand transmission method. Similarly to FIG. 2, the base station of FIG. 3 includes an intra-cell control information storing unit 21, a neighboring base station transmission method storing unit 22, a control information transmitting unit 23, and a transmission information selecting unit 24. Different from FIG. 2, the base station of FIG. 3 also includes a control information request signal receiving unit 25.

The intra-cell control information storing unit 21, the neighboring base station transmission method storing unit 22, the control information transmitting unit 23, and the transmission information selecting unit 24 of FIG. 3 have substantially the same configurations and functions as those of the intra-cell control information storing unit 11, the neighboring base station transmission method storing unit 12, the control information transmitting unit 13, and the transmission information selecting unit 14 of FIG. 2. Therefore, overlapping descriptions of those components are omitted here.

The transmission information selecting unit 24 selects either the intra-cell control information storing unit 21 or the neighboring base station transmission method storing unit 22 according to a trigger from the control information request signal receiving unit 25 and requests the selected storing unit 21 or 22 to output the stored information to the control information transmitting unit 23.

The control information request signal receiving unit 25 receives a control information request signal from the terminal equipment. The control information request signal is transmitted by terminal equipment when the terminal equipment is expected to move across a mesh boundary and needs to determine how to receive the common control signal in a destination mesh (area) The control information request signal receiving unit 25 receives the control information request signal from the terminal equipment and reports the reception of the control information request signal to the transmission information selecting unit 24.

More specifically, when receiving the control information request signal, the control information request signal receiving unit 25 reports the type of requested information to the transmission information selecting unit 24. When receiving the report, the transmission information selecting unit 24 selects the intra-cell control information storing unit 21 or the neighboring base station transmission method storing unit 22, and requests the selected storing unit 21 or 22 to output the stored information. The selected storing unit 21 or 22 outputs the information to the control information transmitting unit 23. The control information transmitting unit 23 generates a signal including the information output from the storing unit 11 or 12 and transmits the generated signal.

With the on-demand transmission method, the information in the intra-cell control information storing unit 21 and the information in the neighboring base station transmission method storing unit 22 are transmitted to the terminal equipment as needed. Accordingly, this method is preferable to improve the frequency efficiency, for example, in an environment where a small number of terminals belong to the area or an environment where there are only a small number of adjacent areas.

Figure 4:
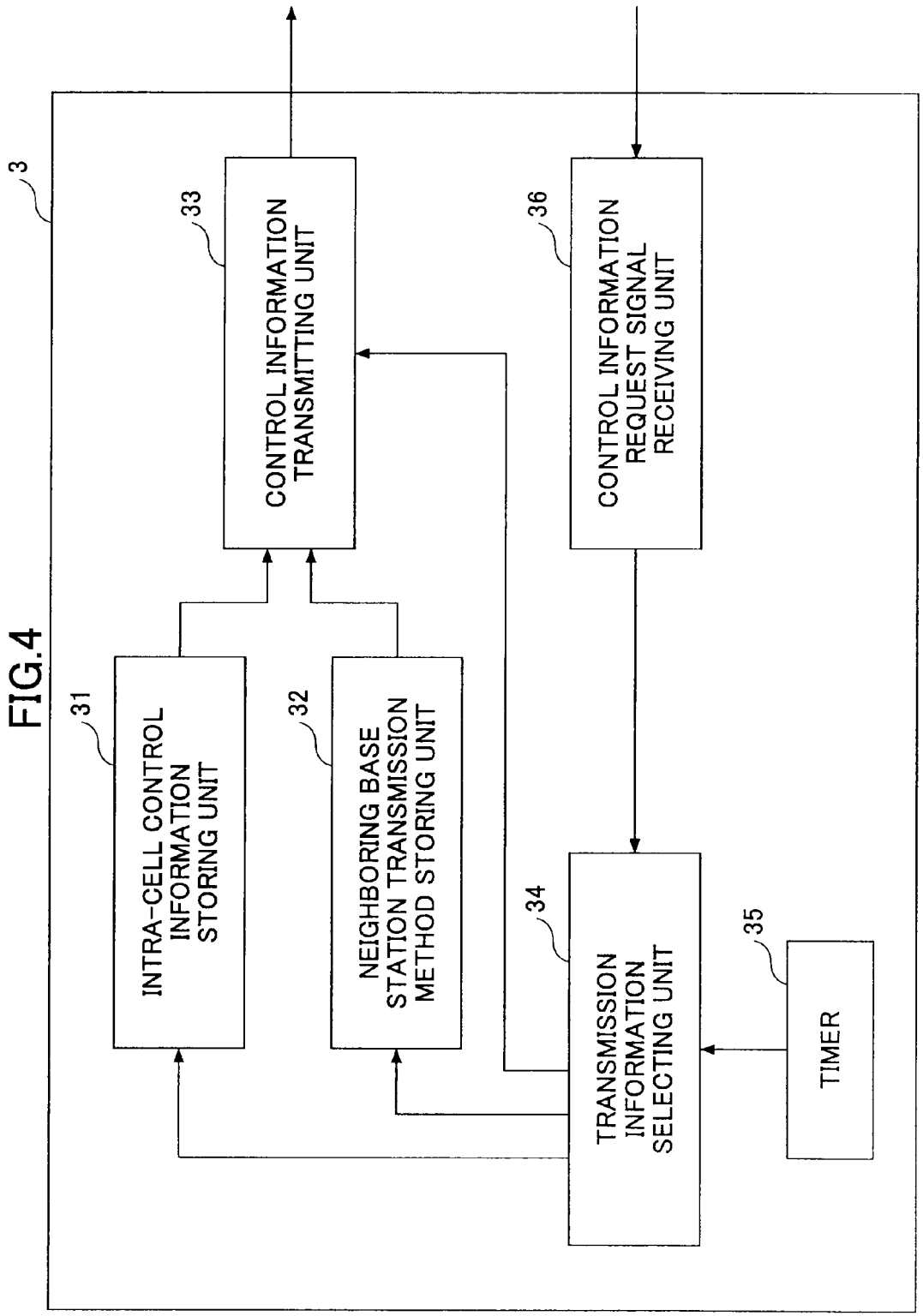
FIG. 4 is a block diagram of a base station transmitting a common control signal using a broadcast transmission method and an on-demand transmission method according to an embodiment of the present invention.

FIG. 4 is a block diagram of a base station transmitting a common control signal using both the broadcast transmission method and the on-demand transmission method. Similarly to FIGS. 2 and 3, the base station of FIG. 4 includes an intra-cell control information storing unit 31, a neighboring base station transmission method storing unit 32, a control information transmitting unit 33, and a transmission information selecting unit 34. The base station of FIG. 4 also includes a timer 35 as in FIG. 2 and a control information request signal receiving unit 35 as in FIG. 3. Since the components of the base station of FIG. 4 have substantially the same configurations and functions as those of FIGS. 2 and 3, overlapping descriptions of those components are omitted here.

When receiving a control information request signal from the terminal equipment, the control information request signal receiving unit 36 reports the type of requested information to the transmission information selecting unit 34 as a trigger. Also, the timer 35 detects the passage of a predetermined period of time and sends a trigger to the transmission information selecting unit 34. The transmission information selecting unit 34 determines the order and timing of transmitting information. When receiving a trigger or triggers from the control information request signal receiving unit 36 and/or the timer 35, the transmission information selecting unit 34 selects one or both of the intra-cell control information storing unit 31 and the neighboring base station transmission method storing unit 32, and requests the selected storing unit(s) 31/32 to output the stored information. The selected storing unit(s) 31/32 outputs the information to the control information transmitting unit 33. The control information transmitting unit 33 generates a signal including the information output from the storing unit(s) 31/32 and transmits the generated signal.

The base station of FIG. 4 may be configured to operate in one of the following methods.

In a first method, system information of radio systems in an area to which the base station belongs is transmitted by the broadcast transmission method and external-area transmission method information indicating the method of transmitting system information of radio systems in an adjacent area is also transmitted by the broadcast transmission method. The first method is preferable for an environment where the number of terminals with a relatively-low moving speed is large.

In a second method, system information of radio systems in an area to which the base station belongs is transmitted by the broadcast transmission method and external-area transmission method information indicating the method of transmitting system information of radio systems in an adjacent area is transmitted by the on-demand transmission method. The second method is preferable to improve the frequency efficiency in an environment where the number of terminals with a relatively-low moving speed is large.

In a third method, system information of radio systems in an area to which the base station belongs is transmitted by the on-demand transmission method and external-area transmission method information indicating the method of transmitting system information of radio systems in an adjacent area is transmitted by the broadcast transmission method. The third method is preferable to improve the frequency efficiency in an environment where the number of terminals is small but their moving speed is relatively high.

FIG. 5 is a block diagram of terminal equipment of this embodiment. As shown in FIG. 5, the terminal equipment includes a system information obtaining unit 41, a base station switching determining unit 42, a control unit 43, a neighboring base station transmission method information receiving unit 44, a timer 45, a neighboring base station transmission method information storing unit 46, a neighboring base station scanning unit 47, and a control information request signal transmitting unit 48.

The system information obtaining unit 41 obtains internal-area information from a common control signal. The internal-area information includes not only intra-cell control information regarding the serving cell but also system information necessary to connect to radio systems in an area to which the serving cell belongs. As is described later, when appropriate parameters are set, the system information obtaining unit 41 can obtain information from common control signals of different areas.

The base station switching determining unit 42 determines whether it is necessary to switch base stations or reselect a base station when obtaining common control information.

The control unit 43 controls other functional components of the terminal equipment.

The neighboring base station transmission method information receiving unit 44 obtains neighboring base station transmission method information from a common control signal. The neighboring base station transmission method information is external-area transmission method information indicating the method of transmitting a common control signal in an area (or a mesh) adjacent to the area to which the serving cell belongs. For example, the external-area transmission method information includes the frequency used to transmit the common control signal and information indicating whether the broadcast transmission method or the on-demand transmission method is used to transmit the common control signal.

The timer 45 detects the passage of a predetermined period of time. The timer 45 has substantially the same function as that of the timer 15 of FIG. 2 and the timer 35 of FIG. 4.

The neighboring base station transmission method information storing unit 46 stores the neighboring base station transmission method information.

The neighboring base station scanning unit 47 performs scanning in a destination area if the external-area transmission method information has not been obtained before moving to the destination area and thereby identifies the method (broadcast or on-demand) by which the common control signal including system information necessary to connect to radio systems in the destination area is transmitted. As described above, in this embodiment, the external-area transmission method information is transmitted to reduce the need to perform scanning. Still, however, the neighboring base station scanning unit 47 is necessary to perform scanning in a conventional area where the external-area transmission method information is not transmitted.

The control information request signal transmitting unit 48 generates a control information request signal for requesting the external-area transmission method information (and/or the internal-area information) when it is transmitted on demand and transmits the generated control information request signal. When the external-area transmission method information of an adjacent area is requested, the control information request signal includes at least the identification information of the adjacent area.

In an exemplary process, the base station transmits, to the terminal equipment in an area $M_1$, external-area transmission method information necessary to receive a common control signal being transmitted in an area $M_2$ adjacent to the area $M_1$. The neighboring base station transmission method information receiving unit receives the external-area transmission method information and sends it to the control unit 43. The control unit 43 sends the external-area transmission method information together with information indicating information obtaining time determined by the timer 45 to the neighboring base station transmission method information storing unit 46. The base station switching determining unit 42 determines whether to switch cells, radio systems, or areas based on the radio reception quality of the internal-area information. In this step, the base station switching determining unit 42 requests the control unit 43 to send the external-area transmission method information for the adjacent (destination)

area. In response to the request, the control unit 43 retrieves the external-area transmission method information from the neighboring base station transmission method information storing unit 46 and sends the retrieved information to the base station switching determining unit 42. Then, the base station switching determining unit 42 determines, based on the information from the control unit 43, parameters necessary to receive the common control signal in the adjacent area and send the determined parameters to the system information obtaining unit 41. With the above configuration, the terminal equipment can obtain system information necessary to connect to radio systems from a common control signal in the current area (where the terminal equipment currently exists) or a common control signal in an adjacent area.

In a case where the external-area transmission method information is transmitted on demand, the control unit 43 may be configured to determine the validity of the external-area transmission method information stored in the neighboring base station transmission method information storing unit 46 before sending the information to the base station switching determining unit 42. For example, the control unit 43 may be configured to determine the difference between the time stamp of the stored external-area transmission method information and the current time and to update the external-area transmission method information if the difference is greater than a predetermined value. In this case, the control unit 43 sends a request to the control information request signal transmitting unit 48 to obtain the external-area transmission method information again. When receiving the request, the control information request signal transmitting unit 48 transmits a control information request signal to the base station to request the external-area transmission method information.

Exemplary methods of transmitting the common control signal are described below with reference to FIGS. 6, 7, and 8.

In the example shown in FIG. 6, system information of the current area (internal-area control information or internal-area system information) and external-area transmission method information are transmitted at regular intervals (timings). In other words, in a transmission frame shown in FIG. 6, the internal-area control information and the external-area transmission method information are both transmitted by the broadcast transmission method.

The internal-area control information includes system information necessary to connect to one or more radio systems in the current area. The external-area transmission method information indicates the method(s) of transmitting the common control information in one or more adjacent areas.

In FIG. 6, it is assumed that there are five adjacent areas. The external-area transmission method information is composed of, for example, six blocks. One block corresponds to overhead information and the remaining five blocks correspond to the information for the respective adjacent areas. Although the external-area transmission method information is divided into six blocks in this example, the external-area transmission method information is not necessarily divided into blocks. The overhead information includes number-of-adjacent-areas information (7 bits) indicating the number of adjacent areas (in this example, 5). The overhead information also includes difference information (1 bit) indicating whether the common control signal transmission method in the current area $M_1$ is the same as the common control signal transmission methods in five adjacent areas $M_2$-$M_6$. Each of the blocks for the adjacent areas includes external-area transmission method information indicating the method of transmitting the common control signal in the corresponding area. In this example, the external-area transmission method information of each adjacent area includes area location information (16 bits) indicating the location of the area, information (1 bit) indicating whether the broadcast transmission method or the on-demand transmission method is used, and carrier information (15 bits) indicating the frequency used. The information items of the external-area transmission method information and the number of bits are just examples and not limited to those shown in FIG. 6.

Here, it is not necessary to always transmit the external-area transmission method information of the five adjacent areas. For example, if the transmission methods used in the areas $M_1$ through $M_6$ are the same, transmission of the external-area transmission method information of the five adjacent areas may be omitted. The terminal equipment can determine whether the transmission method of the current area and the transmission methods of the five adjacent areas are the same based on the difference information in the overhead information. When the overhead information is received and it is determined that the transmission methods of all six areas including the current area are the same, the terminal equipment skips the step of extracting and demodulating the external-area transmission method information of the five adjacent areas. The method of FIG. 6 is preferable to efficiently transmit the external-area transmission method information to a large number of terminals.

In the example shown in FIG. 7, the internal-area control information is transmitted by the broadcast transmission method and the external-area transmission method information is transmitted by the on-demand transmission method. Similarly to the example shown in FIG. 6, the internal-area control information is transmitted at regular intervals (timings). Meanwhile, only the external-area transmission method information of adjacent areas requested by the terminal equipment is transmitted in this example. In other words, the external-area transmission method information of adjacent areas not requested by the terminal equipment is not transmitted. In FIG. 7, the external-area transmission method information of the areas M2, M3, and M5 is transmitted, but the external-area transmission method information of the areas M4 and M6 is not transmitted since they are not requested. Also in this example, the requested external-area transmission method information is transmitted at one of regular transmission timings. More specifically, request signals requesting the external-area transmission method information are received during a predetermined period of time and all the requested information items are transmitted at the same time after the predetermined period of time. In FIG. 7, the external-area transmission method information of the area M2 and the external-area transmission method information of the area M5 are transmitted at the same time. The requested external-area transmission method information is transmitted in a manner similar to the broadcast transmission method described with reference to FIG. 6. That is, one or more sets of the external-area transmission method information are transmitted together with the overhead information.

The terminal equipment may be configured to include only the identification information of the current area in the request signal for requesting the external-area transmission method information. In this case, the transmission information selecting unit 24,34 of the base station transmits the external-area transmission method information of an area(s) that is adjacent to the current area based on the identification information of the current area in the request signal.

The method of FIG. 7 makes it possible to transmit the external-area transmission information only to terminals that need the information.

Also in the example shown in FIG. 8, the internal-area control information is transmitted by the broadcast transmission method and the external-area transmission method information is transmitted by the on-demand transmission method. In FIG. 8, however, the external-area transmission method information of all adjacent areas is transmitted. The external-area transmission method information of an adjacent area requested by the terminal equipment is transmitted immediately after the request signal is received from the terminal equipment. Other sets of the external-area transmission method information of adjacent areas not requested by the terminal equipment are transmitted together at a later regular transmission timing. The other sets of the external-area transmission method information are transmitted in a manner similar to the broadcast transmission method described with reference to FIG. 6. That is, one or more sets of the external-area transmission method information are transmitted together with the overhead information.

The method of FIG. 8 makes it possible to efficiently transmit the external-area transmission method information to a large number of terminals as well as to quickly and individually transmit the external-area transmission method information to terminals sending request signals.

The present invention may be applied to any type of radio system. For example, the present invention may be applied to an HSDPA/HSUPA W-CDMA system, an LTE system, an IMT-Advanced system, a WiMAX system, and a Wi-Fi system. Also, the present invention may be applied to radio systems providing broadcasting services such as television broadcasting (e.g., digital terrestrial television) and radio broadcasting.

The present invention is not limited to the specifically disclosed embodiments, and variations and modifications may be made without departing from the scope of the present invention. Although specific values are used in the above descriptions to facilitate the understanding of the present invention, the values are just examples and different values may also be used unless otherwise mentioned. The distinctions between the embodiments are not essential for the present invention, and the embodiments may be used individually or in combination. Although functional block diagrams are used to describe apparatuses in the above embodiments, the apparatuses may be implemented by hardware, software, or a combination of them.

The present international application claims priority from Japanese Patent Application No. 2008-131376 filed on May 19, 2008, the entire contents of which are hereby incorporated herein by reference.

Explanation of References 1 base station, 11 intra-cell control information storing unit, 12 neighboring base station transmission method storing unit, 13 control information transmitting unit, 14 transmission information selecting unit, 15 timer, 2 base station, 21 intra-cell control information storing unit, 22 neighboring base station transmission method storing unit, 23 control information transmitting unit, 24 transmission information selecting unit, 25 control information request signal receiving unit, 3 base station, 31 intra-cell control information storing unit, 32 neighboring base station transmission method storing unit, 33 control information transmitting unit, 34 transmission information selecting unit, 35 timer, 36 control information request signal receiving unit, 4 terminal equipment, 41 system information obtaining unit, 42 base station switching determining unit, 43 control unit, 44 neighboring base station transmission method information receiving unit, 45 timer, 46 neighboring base station transmission method information storing unit, 47 neighboring base station scanning unit, 48 control information request signal transmitting unit

The invention claimed is:

1. A base station for a system encompassing multiple areas in each of which one or more radio systems are available and system information necessary to connect to the one or more radio systems is transmitted via a control signal to a terminal equipment, the base station comprising:
   an internal-area information memory configured to store the system information necessary to connect to the one or more radio systems in an area to which the base station belongs;
   an external-area transmission method information memory configured to store external-area transmission method information that includes information indicating whether a broadcast transmission method or an on-demand transmission method is used as a method of transmitting the control signal in an area adjacent to the area to which the base station belongs; and
   a transmitter configured to transmit the control signal including the system information stored in the internal-area information memory or the external-area transmission method information to the terminal equipment,
   wherein the control signal including the external-area transmission method information is transmitted at regular or irregular transmission timings.

2. The base station as claimed in claim 1, wherein the external-area transmission method information is transmitted regularly as a part of broadcast information to the terminal equipment.

3. The base station as claimed in claim 1, wherein a part or all of the external-area transmission method information is transmitted in response to a request from the terminal equipment.

4. The base station as claimed in claim 3, wherein a part of the external-area transmission method information requested by the terminal equipment is transmitted immediately in response to the request, and other parts of the external-area transmission method information are transmitted at a regular transmission timing.

5. A terminal equipment for a system encompassing multiple areas in each of which one or more radio systems are available and system information necessary to connect to the one or more radio systems is transmitted from a base station via a control signal, the terminal equipment comprising:
   a receiver configured to receive the control signal from the base station of a serving cell;
   an internal-area information obtainer configured to obtain, from the received control signal, internal-area information necessary to connect to the one or more radio systems in an area including the serving cell; and
   an external-area transmission method information obtainer configured to obtain, from the received control signal, external-area transmission method information that includes information indicating whether a broadcast transmission method or an on-demand transmission method is used as a method of transmitting the control signal in an area adjacent to the area including the serving cell,
   wherein the control signal including the external-area transmission method information is received at regular or irregular reception timings.

6. The terminal equipment as claimed in claim 5, wherein the external-area transmission method information is received at regular reception timings as a part of broadcast information.

7. The terminal equipment as claimed in claim 5, wherein the external-area transmission method information is received in response to a request signal transmitted from the terminal equipment to the base station.

8. The terminal equipment as claimed in claim 7, wherein a part of the external-area transmission method information requested by the terminal equipment is received immediately in response to the request, and other parts of the external-area transmission method information are received at a regular reception timing.

9. A method performed by a base station for a system encompassing multiple areas in each of which one or more radio systems are available and system information necessary to connect to the one or more radio systems is transmitted via a control signal to a terminal equipment, the method comprising the steps of:

storing the system information necessary to connect to the one or more radio systems in an area to which the base station belongs in an internal-area information memory and storing external-area transmission method information that includes information indicating whether a broadcast transmission method or an on-demand transmission method is used as a method of transmitting the control signal in an area adjacent to the area to which the base station belongs in an external-area transmission method information memory; and transmitting the control signal including the system information stored in the internal-area information memory or the external-area transmission method information to the terminal equipment, wherein the control signal including the external-area transmission method information is transmitted at regular or irregular transmission timings.

10. A method performed by a terminal equipment for a system encompassing multiple areas in each of which one or more radio systems are available and system information necessary to connect to the one or more radio systems is transmitted from a base station via a control signal, the method comprising the steps of:

receiving the control signal from the base station of a serving cell; and obtaining, from the received control signal, internal-area information necessary to communicate using the one or more radio systems in an area including the serving cell and external-area transmission method information that includes information indicating whether a broadcast transmission method or an on-demand transmission method is used as a method of transmitting the control signal in an area adjacent to the area including the serving cell, wherein the control signal including the external-area transmission method information is received at regular or irregular reception timings.

* * * * *